Figure 5:
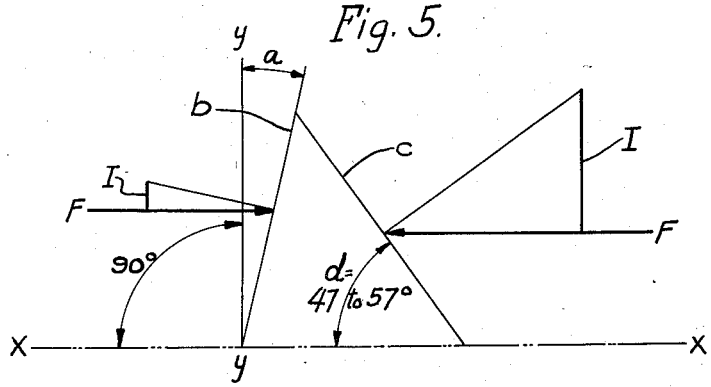

Sept. 28, 1937.  R. JANATA  2,094,491
SCREW THREAD JOINT
Filed July 20, 1934  2 Sheets-Sheet 1
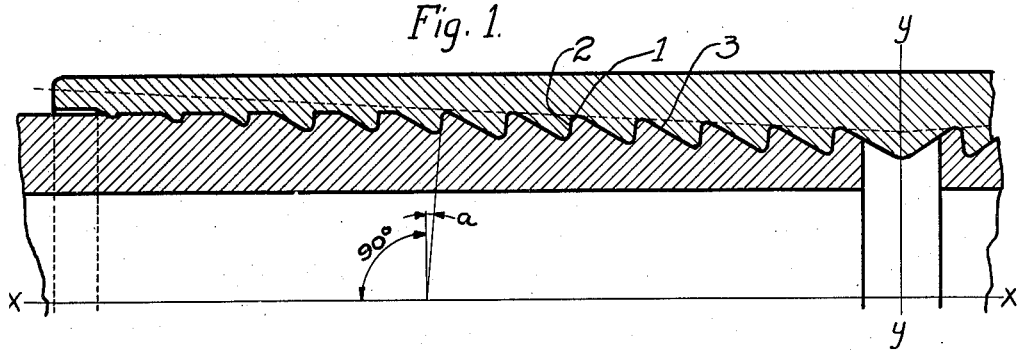
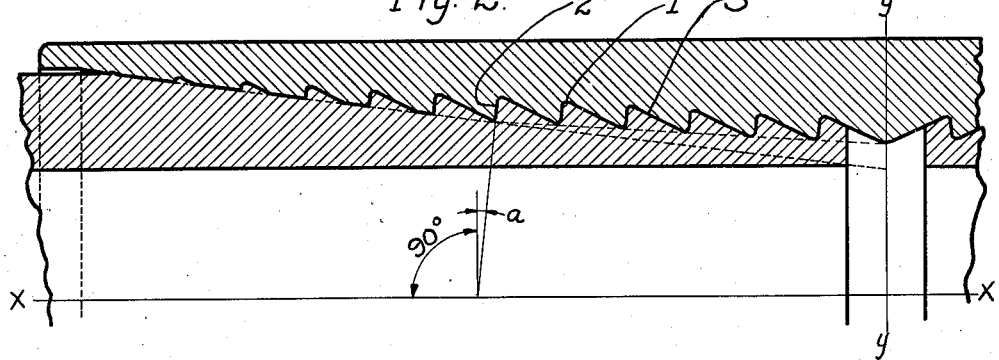
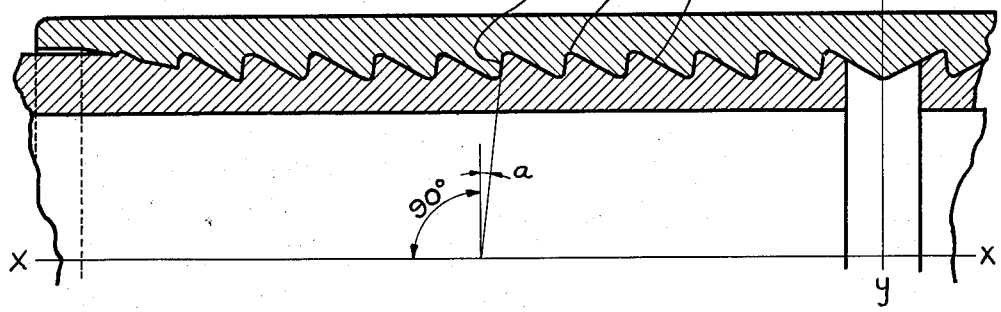
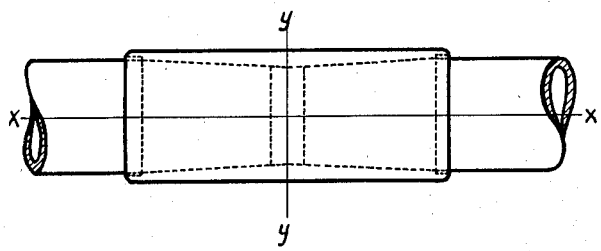
INVENTOR
Rudolph Janata
BY William B. Jaspert
ATTORNEY Sept. 28, 1937.  R. JANATA  2,094,491

SCREW THREAD JOINT

Filed July 20, 1934  2 Sheets-Sheet 2

INVENTOR
Rudolph Janata
BY William B. Jaspert
ATTORNEY

Patented Sept. 28, 1937

2,094,491

UNITED STATES PATENT OFFICE 2,094,491

SCREW THREAD JOINT

Rudolph Janata, Pittsburgh, Pa.

Application July 20, 1934, Serial No. 736,159

4 Claims. (Cl. 285—146)

My invention relates to improvements in joints for tubing, rods, and the like, and more particularly to screw threaded joints for coupling tubes, pipes and solid rods which are subjected to severe stress in use as, for example, oil well casings, and the present application is a continuation in part of an application serially numbered 432,591 filed by me March 3, 1930.

It is among the objects of the invention to provide a screw joint in which secondary, transverse or component stresses are avoided, or reduced to a minimum thereby permitting longer length of strings of oil well casings which have to carry their own weight, and in pipes and solid rods in which forces or stresses are to be taken up mainly in one direction and which shall produce stronger joints substantially as tight as the conventional 60° angle thread and tighter than square threads.

In addition to these advantages, my improvement will permit the use of shorter threads, shorter coupling and thinner coupling for screw joints of casings, pipes, solid rods or other cylindrical objects. I accomplish this by the selection of suitable thread angles as hereinafter more specifically described.

Figure 6:
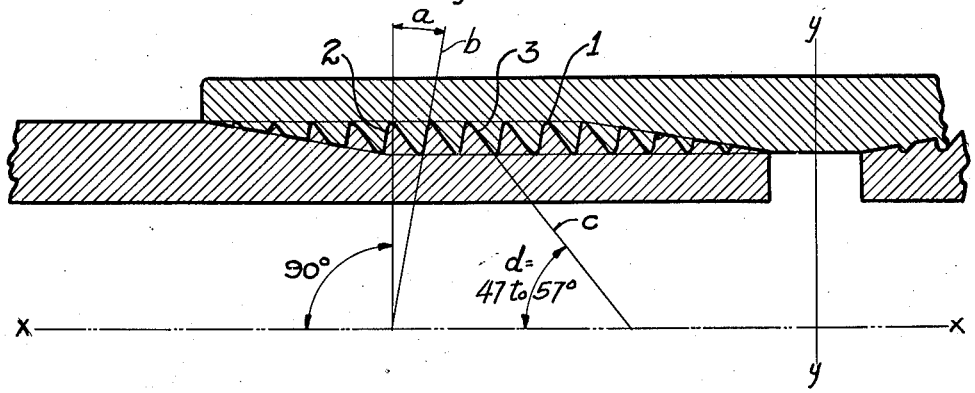
Figure 7:
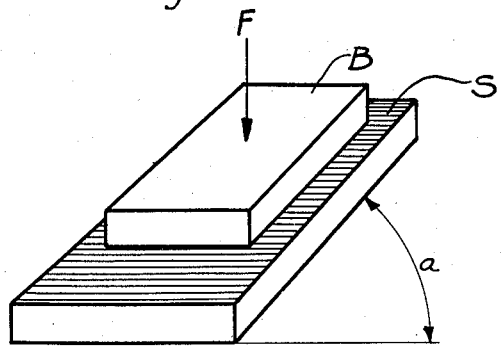

In the accompanying drawings constituting a part hereof in which like reference characters designate like parts Fig. 1 is a cross-sectional view extending longitudinally through a pipe joint illustrating one embodiment of the invention;

Fig. 2 a modified form applied to a double taper on casing, pipe or rod;

Fig. 3 a cross-sectional view of a straight joint embodying the principle of this invention;

Fig. 4 an elevational view of an assembled joint;

Fig. 5 a diagrammatic view illustrating the forces acting upon the bearing surfaces of my improved form of thread;

Fig. 6 a cross-section of a portion of threaded joint diagrammatically illustrating the thread angles;

Fig. 7 a diagrammatic showing of a movable block and support; and

Figure 8:
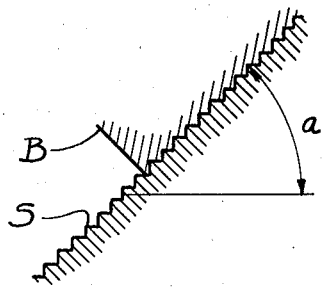

Fig. 8 a diagrammatic view of the contacting surfaces of the block and support of Fig. 7.

In the drawings, the numeral 1 designates a thread shaped to form the angle $a$ between the bearing surface 2 of the thread and the perpendicular Y—Y to the longitudinal axis X—X of the casing, pipe rod or other cylindrical objects on which the threads are formed.

This angle in the present invention is always like or less than an angle $a$, Figs. 7 and 8, which is just sufficient to prevent the slipping of the bearing surfaces over each other and to prevent uncoupling of the joint due to longitudinal stress. By so forming the thread, with a certain finish of the bearing surface described hereinafter, it has been found that uncoupling due to longitudinal stress is absolutely avoided and the efficiency in tensile strength of joint has been brought to a maximum. This is shown graphically in Fig. 5 of the drawings, in which F is the force acting upon the bearing surface 2, and I the component produced by inclined bearing surface if friction is neglected. By controlling the character of the bearing surface 2 and consequently the friction, the component or transverse stress is eliminated.

The invention may be used for single taper, double taper, or a combination of tapered or straight threads as shown in Fig. 6 and is especially useful in oilwell casings, where the highest efficiency in joints is desirable.

It is well known that variation in shearing or transverse strength of various steel alloys is not proportional to the tensile strength and due to this fact the strength of a casing or pipe-joint is difficult to determine with the now customary 60 degree threads because of the transverse stresses produced when a longitudinal force is applied to the joint. I have discovered that using threads in combination of disappearing threads, Figs. 1 and 2, or straight threads, Fig. 3, or straight and tapered threads, Fig. 6, and combinations thereof having the bearing surface inclined as described above, and finished as described hereinafter, the transverse stresses are eliminated, the longitudinal stress being the only one involved in determining the strength of a joint.

The slipping of a surface pressed against another surface when the latter is inclined will occur when the inclination of the surfaces reaches the angle of friction. The angles of friction depend not only on the material but also upon the condition of the bearing surface. Considering metal as the material, a smooth surface has a smaller angle of friction than a rough surface and by giving the bearing surface a predetermined finish, the angle of friction may be altered at one's will. In my invention the best suited angle from standpoint of friction as well as from standpoint of strength of threads in shear is selected for a given purpose. For example, the angles of the triangular threads of an oilwell casing which has to resist mostly longitudinal tension, but which at times is exposed to smaller compressive stresses, will be different than the angles of triangular threads of a line pipe which, due to contraction, caused by temperature differences, may have to resist tension, but no compression. The angles of triangular thread for tension rods would similarly differ from those of oilwell casing threads; but in all cases, the angle between the bearing surface carrying the largest stress and a plane at right angle to the longitudinal axis is less than or approximately the angle of friction of the bearing surface.

Figure 7 illustrates how the desired angle of friction may be determined; the surface of the threads designated by the character S has small grooves or furrows hardly visible to the eye, produced by tooling in machining the thread. F is the force acting upon surface S which in Fig. 7 is the weight of the block B. $a$ is the friction angle which is the degree of inclination of the surface S at which the block B will begin to slide.

Fig. 8 shows grooves or furrows in the bearing surface greatly magnified. It is obvious that by having furrows that correspond exactly in the cooperating bearing surfaces of the threads, running at a right angle to the direction in which motion or slipping of the bearing surfaces under a longitudinal force on a joint would occur; a smoother thread surface will result in a smaller and rough surfaces in a larger angle of friction.

The grooves are produced by the cutting tool which is used for the making of the thread tap by various means; grinding or, for instance, by means of a fine chisel in a similar way as the teeth of a file are produced. The tap after proper heat treating in turn is used to produce the die thereby assuring the proper characteristics of the thread surfaces.

In assembling oilwell casing, while the principal bearing surface 2 is inclined to the longitudinal axis 90 degrees, less the approximate angle of friction of this bearing surface, the other surface 3 must be inclined in such a way as not to create too great frictional resistance to the turning of the threaded section within the coupling at its lower end. If the frictional resistance is excessive the threads will shear off as the so-called stabbing of the casing is done in a vertical position when running casing into a well, thereby exerting the weight of a section of casing on the threads, while the section is rotated rapidly by means of machinery.

Also, oilwell casing, when resting on end at bottom of well is subjected to compressive stress before it is pulled into the desired position. If angle "$d$" is a sharp angle, for instance 30 degrees, it would cause the threads to gall (peal off), the coupling to spread, the pipe to reduce in diameter, and it would destroy the joint or at least make it leaky. The proper angle "$d$" for this other side of the thread in combination with the bearing surface of angle $a$ inclined at the proper friction angle as described above should not be less than 47 to 57 degrees to the longitudinal axis of the pipe and the surface of this face should have as smooth a finish as possible.

The main bearing surface "$b$", Fig. 6, is inclined to a plane at right angle to the longitudinal axis by less than or approximately the angle of friction of the furrow-finished surface. The surface "$c$" of the thread, is inclined from 47 to 57 degrees to the longitudinal axis and has a smooth-finish, in combination with or without vanishing threads of the same angularity and finish as the perfect threads, with or without taper on pipe and in coupling for the purpose of obtaining the maximum strength.

Figures 1, 2 and 6 show the invention employed on disappearing threads in both pipe and coupling to provide maximum net area at base of thread under the ultimate tensile stress. If 60° standard thread is employed the resulting transverse stresses spread the coupling and reduce the pipe thus causing acceleration of slippage at the joint which would make the disappearing threads ineffective. By employing the disappearing threads of Figures 1, 2 and 6, maximum net area under ultimate stress is provided and by selecting the thread angle to correspond to the angle of friction of a given material and surface finish, the transverse stresses are eliminated and deformation of the joint due to transverse stress is prevented.

If the thread is deeper than necessary, the cross-sectional net area of the pipe or coupling is reduced so that the maximum tensile efficiency cannot be obtained; if, however, the thread that is too deep is combined with disappearing or vanishing thread as in this invention, then the correct depth of the thread acts automatically by letting the pipe thread which is not deep enough slip out of the coupling thread, but stopping the slippage at the correct depth which is provided by having all depths from too deep a thread to a zero depth. The pipe thus will break in its largest possible net area, assuring the maximum efficiency for the joint.

From the foregoing it is evident that the angle of friction for surfaces of predetermined or existing finish is an unalterable resistance or a measure of work needed to slide surfaces over earth or other material under load. This resistance is capable of establishing and maintaining an equilibrium in a structure. The angle of friction of metals can be altered by altering the finish of the bearing surface, therefore, to express the angle of the principal bearing surfaces of angular threads in degrees would not fully describe or disclose the idea of the present invention as there is no measure for smoothness or greasiness, which, it is necessary to state, in connection with angles based on friction where the angles are expressed in degrees. However, there is no doubt of what is meant by the angle of friction of the bearing surface. The term "angle of friction" may be found in any standard dictionary—it is the angle which the plane of contact between two bodies makes with the horizontal when the upper body is just on the point of sliding; the angle whose tangent is the coefficient of friction between the two bodies.

I claim:

1. A screw joint for coupling the adjacent ends of cylindrical members having triangular tooth shaped threads adapted to be formed in the coupling member and on the ends of adjacent cylindrical members the principal bearing surface having a furrow finish, the angle of the principal bearing surface of the thread, formed with the perpendicular to the longitudinal axis of the cylindrical coupled members or pipes or other cylindrical objects being less than or approximately the angle of friction of the bearing surface, as determined by the surface finish of said bearing surface, the angle varying with the character of said surface, the rougher the surface the greater the angle.

2. A screw joint for pipes and similar articles having triangular tooth shaped threads the principal bearing surface having a furrow finish, the angle of the principal bearing surface of which formed with the perpendicular to the longitudinal axis of the pipes or other articles, being less than or approximately the angle of friction of the bearing surface of the threads as determined by the coarseness of said principal bearing surface.

3. A screw joint for oilwell casings, tubings, pipes or other cylindrical objects, having triangular threads adapted to be formed in the coupling member and on the ends of the adjacent casings the principal bearing surface of which has a furrow finish and being inclined to a plane at right angle to the longitudinal axis by approximately the angle of friction of this furrow finished bearing surface and having on the second side of the triangle a very smooth surface inclined by 47 degrees to 57 degrees to the longitudinal axis of the casing, and the third side being parallel or inclined by the customary taper to the axis of the casing forming the base of the triangle and being connected to or forming part of the other mass or material of the casing.

4. A screw joint for oil well casings, tubes or other cylindrical objects with part of the threads perfect and part imperfect or vanishing, having triangular threads in the perfect part of the threads and angular threads in the imperfect or vanishing part of the threads adapted to be formed in the coupling member and on the ends of adjacent casings, in the perfect part of the threads the principal bearing surface having a furrow finish and being inclined to a plane at right angles to the longitudinal axis by less than or approximately the angle of friction of this furrow finished bearing surface, and having on the second side of the triangle a very smooth surface inclined by 47 to 57 degrees to the longitudinal axis of the casing, and the third side being parallel or inclined by the customary taper to the axis of the casing forming the base of the triangle, and being connected to or forming part of the other mass or material of the casing, the vanishing threads having the same inclination and finish for the principal bearing surface and the surface on the second side of the triangle, respectively, as described in the perfect part of the threads.

RUDOLPH JANATA.